Sept. 10, 1940.     F. LUX     2,214,504
GEAR HOBBING MACHINE
Filed June 27, 1936     3 Sheets-Sheet 2
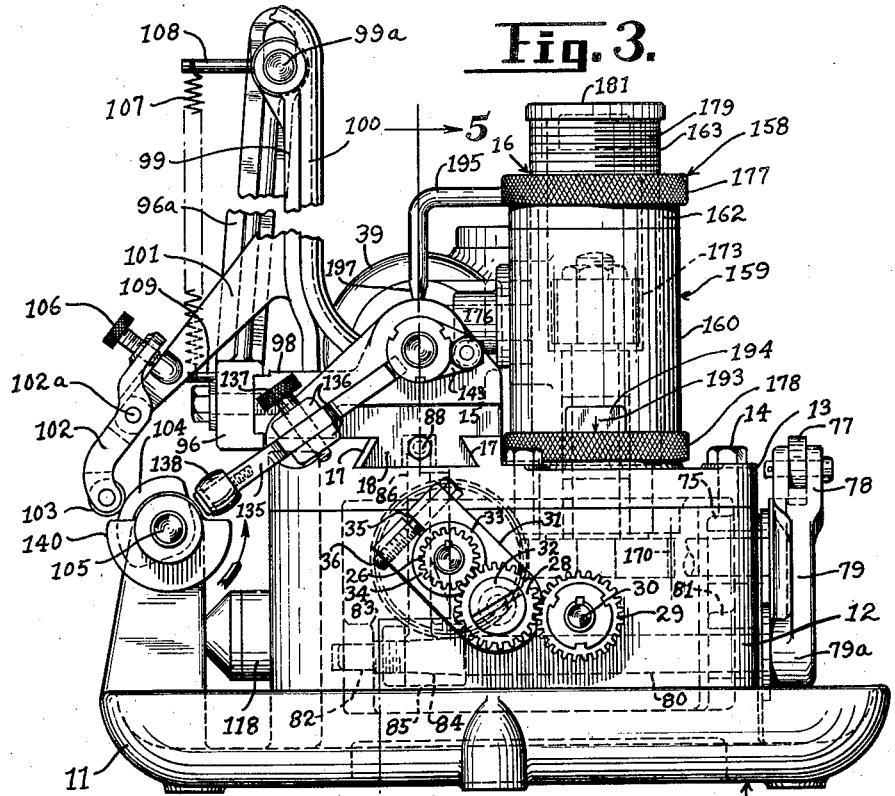
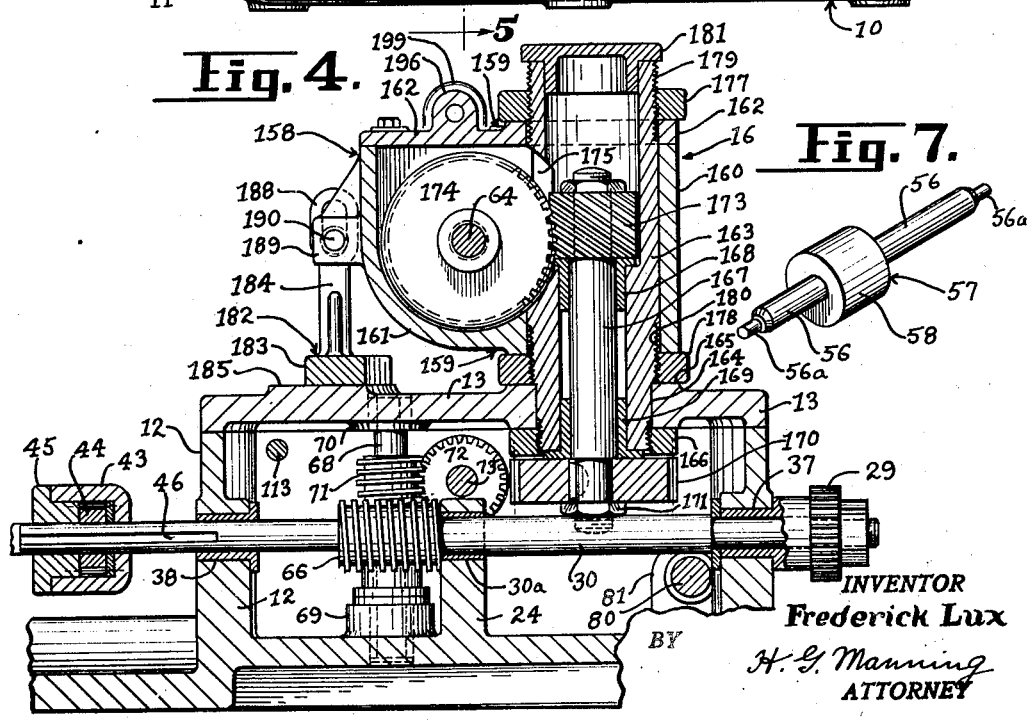
INVENTOR
Frederick Lux
BY
H. G. Manning
ATTORNEY Sept. 10, 1940.   F. LUX   2,214,504
GEAR HOBBING MACHINE
Filed June 27, 1936   3 Sheets-Sheet 3

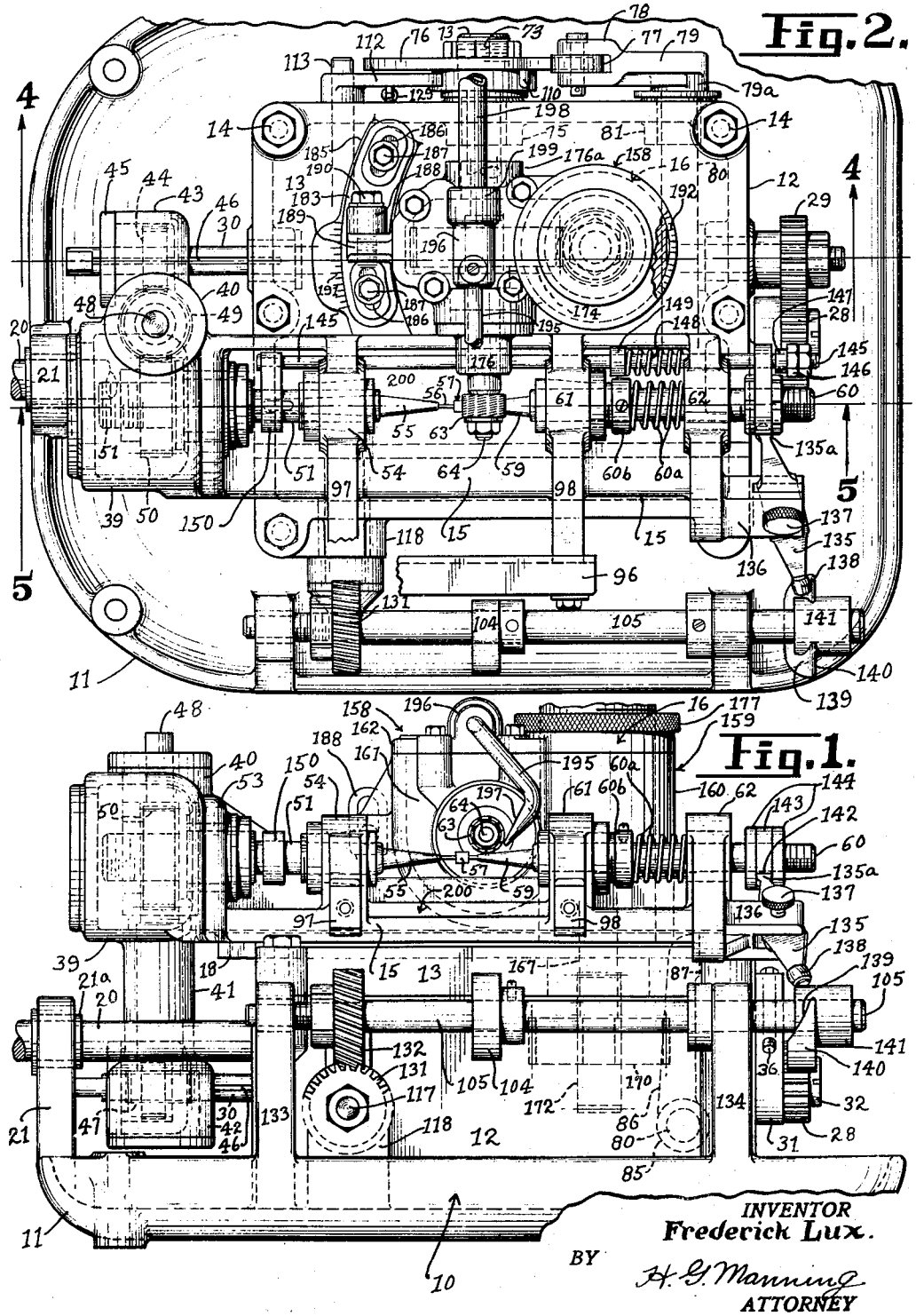

INVENTOR
Frederick Lux
BY
H. G. Manning
ATTORNEY

Patented Sept. 10, 1940

2,214,504

UNITED STATES PATENT OFFICE 2,214,504

GEAR HOBBING MACHINE

Frederick Lux, Waterbury, Conn.

Application June 27, 1936, Serial No. 87,704

12 Claims. (Cl. 90—3)

This invention relates to gear cutting machines, and more particularly to an automatic hobbing machine designed to cut small gears or pinions, such as are used in clocks.

It is well known that large gears and pinions may be accurately produced by the so-called "hobbing" process, but hitherto to was not considered practicable to employ hobbing machines for the rapid production of small pinions or gears. There are three distinct reasons why hobbing machines have not been more generally applied to the cutting of small pinions:

First, it has been difficult to design a hob spindle mounting and drive sufficiently small to be applicable to the hobbing of small pinions, and at the same time, strong enough to be satisfactory in service;

Second, in view of the fact that a pinion blank is relatively short, much time is lost while the hob is approaching the pinion and in the initial cutting thereof until the full depth of the tooth cut is reached; and Third, the mechanism for automatically feeding pinion blanks into hobbing position was quite complicated.

By means of the present invention, the above and other disadvantages have been overcome.

One object of this invention is to produce a hobbing machine which will automatically feed the pinion blanks into cutting position, and automatically eject them from the machine after said blanks have been properly cut.

A further object is to provide a machine of the above nature having means for moving the pinion blank up to the cutting periphery of the hob at a rapid rate of speed, and in which the initial cutting of the blank will be performed at a relatively high rate of speed until the full depth of cut has been reached, and in which the movement of the blank is then slowed down to a uniform speed for cutting the main portion of said blank.

A further object of the invention is to provide a machine of the above nature in which it is unnecessary to alter the cutting feed of the machine when cutting pinions of the same length, but of varying number of teeth.

A further object is to provide a machine of the above nature having improved means for accurately and minutely adjusting the angular and vertical positions of the cutting hob in accordance with various types of gears and pinions that may be cut upon the machine.

A further object of this invention is to provide an automatic hobbing machine which will be relatively simple and inexpensive to manufacture, easy to operate, which will incorporate all the advantages of the hobbing process and make them applicable to the manufacture of small pinions, such as are used in small clocks and watches, and which will be very efficient and durable in use.

With these and other objects in view there has been illustrated on the accompanying drawings one form in which the invention may be conveniently embodied in practice.

In the drawings:

Fig. 1 represents a front elevation of the automatic hobbing machine with the blank feeding magazine omitted.

Fig. 2 is a plan view of the same.

Fig. 3 is a right-hand end elevational view of the machine, showing the magazine attached thereto.

Fig. 4 is a longitudinal sectional view through the hobbing cutter mechanism, the view being taken substantially along the line 4—4 of Fig. 2, looking in the direction of the arrows.

Fig. 7 is a perspective view, on a greatly enlarged scale, of a typical blank fed by the magazine to be cut into a pinion by the hobbing machine.

Figure 5:
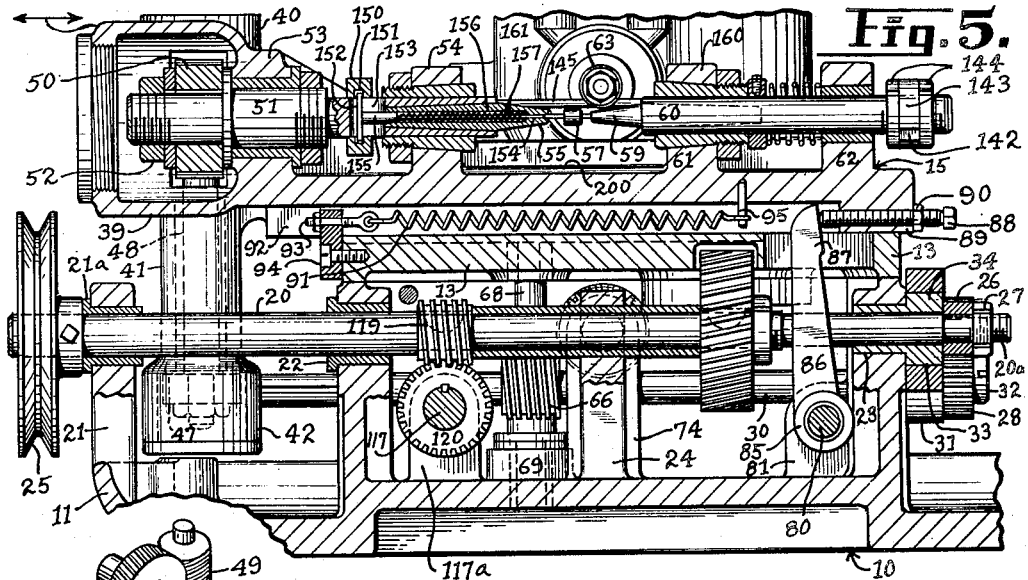
Fig. 5 is a longitudinal sectional view of the machine taken substantially along the line 5—5 of Fig. 2, and on the line 5—5 of Fig. 3, looking in the direction of the arrows.

Referring now to the drawings in which like reference numerals denote corresponding parts throughout the several views, the numeral 10 indicates generally the body of the hobbing machine, which includes a dish-like bottom catch pan or basin 11, having an integral upstanding rectangular lubricant containing housing 12 for encasing the principal gear mechanism of the machine. The housing 12 is open at the top and is adapted to be closed by a relatively heavy cover plate 13 attached thereto as by cap-screws 14. The cover plate 13 is provided with a dovetailed slot 17 (see Fig. 3) for supporting a reciprocating work-carrying slide 15 and also an adjustably mounted cutter head casing 16, which parts will be hereinafter more fully described. The slot 17 is adapted to slidably receive a corresponding dove-tailed section 18 formed integral with and depending from the under side of said slide 15.

Main drive mechanism

Figure 6:
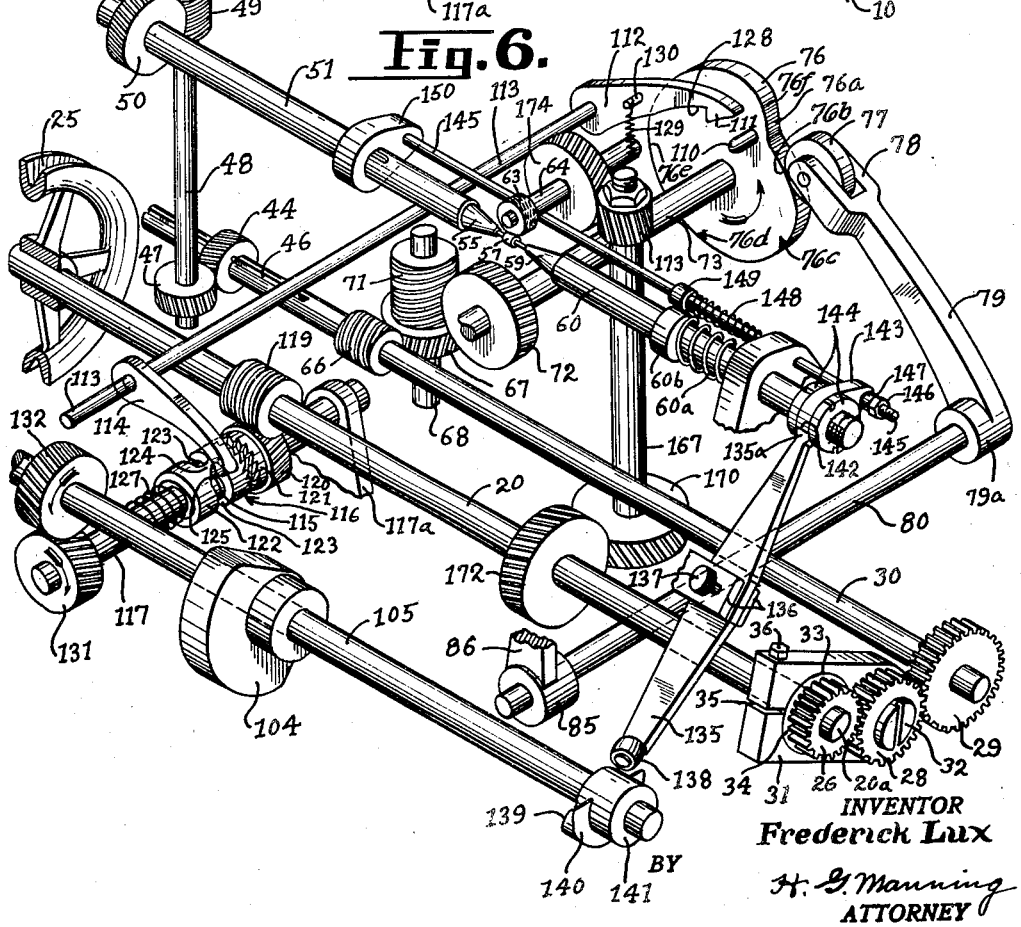
Fig. 6 is a diagrammatic perspective view showing the arrangement of the various gears, cams, shafts, and other interior mechanism.

The main drive mechanism, which is best shown in Figs. 5 and 6, comprises a main shaft 20 supported at one end by an upright standard 21 formed integral with the left end of the basin 11, and suitably journaled therein by means of a bushing 21a. The shaft 20 is also suitably journaled in the housing 12 by means of an intermediate bushing 22 and a bushing 23 located in the opposite wall of the housing 12. Another intermediate support for the shaft 20 comprises an upstanding bearing member 24 formed integral with the bottom wall of said housing 12.

A grooved driving pulley or sheave 25 is attached to the left end of the main drive shaft 20, as viewed in Figs. 5 and 6, and may be connected by a belt, not shown, to a suitable source of energy such as an electric motor, not shown. The extreme right end of the main drive shaft 20 is provided with a reduced section 20a having a spur gear 26 which is clamped thereon by a clamping nut 27. The spur gear 26 is adapted to drive an "index" gear 29 keyed on the right end of a back shaft 30 which also passes entirely through the machine parallel to the main drive shaft 20.

An idler gear 28 is rotatably supported at the free end of a swingable bracket 31 by means of a journal stud 32. The upper opposite end of the bracket 31 is formed with a reltaively large gearing hole 33 which is adapted to engage about a cylindrical bearing head 34 herein shown as an integral part of the main shaft bearing bushing 23 (see Fig. 5).

The upper end of the idler gear bracket 31 is split at 35, and the side sections thereof are clamped tightly about the head 34 by a binding screw 36. By means of this construction, the bracket 31 may be swung to one side whenever desired to permit changing of the gear 29 on the shaft 30 according to the number of teeth on the pinion being cut.

The back shaft 30 is suitably journaled in the right and left walls of the housing 12 respectively by means of bushings 37 and 38 carried by said walls (see Fig. 4). The intermediate section of the shaft 30 is also supported within the housing 12 by a sleeve bushing 30a carried by the upright bearing member 24 previously mentioned.

Reciprocating work-carrying slide

As best shown in Figs. 1, 2 and 5, the work-carrying slide 15 has an integral enlarged hollow head 39 at its left end from which extends a rearwardly offset upper gear housing 40 located on a vertical axis. Depending from the housing 40 there is provided a tubular casing 41 terminating at its lower end in an enlarged lower gear housing 42. The lower gear housing 42 has a laterally offset cup-shaped gear casing 43, positioned to the rear thereof (see Fig. 2). All of the above parts designated by the numerals 39, 40, 41, 42 and 43 form component parts of the work slide 15, and consequently reciprocate with it as a unit.

The cupped casing 43 is positioned with its axis coinciding with the axis of the back shaft 30 which extends through said cup 43, as best shown in Fig. 2. A spiral gear 44 is rotatably confined within the cupped housing 43 by means of an end thrust cover member or cap 45 suitably attached to the open end of said housing 43. The spiral gear 44 is provided with a suitable key which is adapted to slidably engage in a longitudinal grooved key-way 46 cut into the peripheral surface of the back shaft 30.

The slidable spiral gear 44 intermeshes with a spiral gear 47 located in the lower gear housing 42 and keyed to the lower end of a vertical index shaft 48, which extends upwardly through the tubular casing 41 and is suitably journaled therein.

A worm 49 is carried by the upper end of the shaft 48 and intermeshes with a worm wheel 50 keyed to the left end of a rotating head stock shaft 51, being held in place by a locking nut 52. One end of the headstock 51 is journaled in a bushed bearing 53 forming a part of the housing 39, while the opposite inner reduced portion of the headstock shaft 51, as shown in Fig. 5, is journaled in another bushed bearing 54 forming an upstanding integral part of the work slide 15.

The inner end of the headstock shaft 51 is provided with a tapered socket for receiving a work-driving spindle 55 tapered at both ends, the inner end of said spindle 55 being adapted to receive one end of a journal shaft 56 of a pinion blank 57, as shown in Fig. 7. The intermediate part of the blank 57 is formed with an enlarged cylindrical shaped section 58 adapted to have gear teeth cut thereon, and said blank terminates in reduced trunnions 56a adapted to tightly fit into the socket of said spindle 55, whereby the blank 57 will be rotated by said driving spindle by the action of friction.

The right-hand end of the gear blank shaft 56, as viewed in Fig. 7, is loosely mounted to rotate freely in the tapered exposed end of a work support tapered spindle 59 which engages in a tapered socket provided in a tailstock shaft 60. The shaft 60 is suitably supported at its inner end by means of a bushed bearing 61, and at its outer end in another bushed bearing 62, both of which bearings forming upstanding intgeral parts of the work slide 15. It will be understood that the tailstock shaft 60 and attached tapered spindle 59 do not rotate in the bearings 61 and 62, but merely slide coaxially therein.

Work slide actuating mechanism

In order to move the revolving pinion blank 57 into the path of a rotating gear-cutting hob 63 carried at the forward end of a horizontal rotating hob spindle 64, at a greater speed than the normal cutting speed, provision is made of a cam controlling mechanism for operating the work slide now to be described. As best shown in Figs. 4 and 6, the shaft 30 carries a rigidly keyed horizontal worm 66 which is adapted to intermesh with a worm wheel 67 carried by a vertical relatively short shaft 68. As shown in Fig. 4, the lower end of the shaft 68 is suitably journaled in a bushed bearing boss 69 forming an upstanding integral part of the housing base, while the upper end of said shaft 68 in turn is journaled in a bushed bearing 70 provided in the cover plate 13 of the housing 12.

Above the worm wheel 67 and rigidly carried by the shaft 68 is a worm 71, which intermeshes with a worm wheel 72 keyed to the inner end of a horizontal cam shaft 73. The forward end of the cam shaft 73 is journaled in a suitable bearing support 74 forming an integral part of the upstanding support 24 previously mentioned (see Fig. 5). The rear end of the cam shaft 73 in turn is journaled in a bushed bearing boss 75 which, as shown in Fig. 2, forms an integral part of the rear wall of the housing 12. The shaft 73 extends through the rear of the housing 12 and has a slide operating cam 76 removably secured thereto by means of a nut 73a.

The peripheral working surface 76a of the cam 76 (Fig. 6) is adapted to be engaged by a follower roll 77 pivoted to the outer bifurcated end 78 of an upwardly inclined swinging arm 79. The lower end of the arm 79 is formed with an integral hub 79a which is preferably integral with the outer end of a rocker shaft 80 which extends into the interior of the housing 12 and is journaled in a bearing boss 81 in the rear wall of said housing (see Figs. 3 and 5). The front end 82 of the rocker shaft 80 is reduced and journaled in a suitable bearing boss 83 in the front wall of the housing 12. The intermediate portion of the rocker shaft 80 adjacent the front bearing is provided with a tapered section 84 for receiving a hollow hub 85 forming the integral lower connecting part of an upwardly projecting work-slide-operating lever 86. As clearly shown in Fig. 5, the upper end of the lever 86 is provided with a flat faced head 87 which is adapted to engage against the inner end of an adjustable horizontal set screw 88 threadedly engaged in a tapped hole provided in a depending portion 89 forming an integral part of the left end of the work-slide 15. The set screw 88 is adapted to be retained in any desired adjusted position by means of a lock nut 90.

The work slide 15 is adapted to be moved by the action of the cam 76 to the right for feeding the pinion blank 57 against the cutting hob 63 against the influence of a relatively strong helical spring 91 which is located in an elongated groove 92 formed in the under surface of the work slide 15, as best shown in Fig. 5. The left end of the spring 91 (see Fig. 5) is attached to a suitable anchor bolt 93 connected to a stationary lug plate 94 secured to the left end of the housing cover plate 13. The right end of the spring in turn is connected to a depending anchor pin 95 depending from the work slide 15, and the tension of the spring tends to return the slide to its normal left end position. When the work slide has been moved as far as it will go in the left-hand direction by the spring 91 and under the control of the cam 76, the work spindles 55 and 59 will then be in proper position to discharge a cut pinion and receive a new pinion blank as will be later described.

*Pinion blank magazine*

The magazine for feeding the pinion blanks 57 is clearly shown in Fig. 3, and comprises a supporting bracket 96 attached to the forward end of a pair of supporting arms 97 and 98, projecting forwardly and formed integral with the spindle bearings 54 and 61, respectively. The supporting bracket 96 includes an upwardly rearwardly inclined longitudinal arm 96a adjustably carrying a fulcrum stud 99a at its upper end. A depending cam-operated inclined lever 99 is swingably supported upon the stud 99a and carries with it a magazine guide 100 attached to the forward face thereof. The lower extremity of the guide 100 is curved forwardly, so that its discharge end will be positioned in relatively close proximity to the feeding station of the machine.

In order to impart swinging motion to the lever 99, a forwardly extending angular arm 101 is carried by the lower end of the said lever, and has an adjustable lever 102 pivoted thereon by means of a pivot pin 102a. The outer end of the lever 102 is bifurcated and has a roller 103 (see Fig. 3) journaled therein for engaging the peripheral surface of a sector cam 104 made secure to a cam shaft 105. The upper end of the lever 102 is provided with an adjusting screw 106 threadedly engaged therein, and adapted to have its inner end abutting against the adjacent surface of the angular arm 101. By adjusting the set screw 106, it will be readily understood that the feeding end of the magazine 100 can be brought into proper alinement with the working center line of the machine.

To hold the roller 103 in constant peripheral engagement with the cam 104, it being understood that the face of the cam 104 is of sufficient width to permit maximum movement of the slide 15 without the roller 103 becoming disengaged therefrom, provision is made of a vertical helical tension spring 107 having its upper end secured to an anchor pin 108 attached to the upper hub part of the magazine cam lever 99 and projecting forwardly therefrom. The lower end of the spring 107 is made secure to a stationary pin 109 projecting forwardly from the cross-member of the bracket 96.

*Magazine feeding mechanism*

In order to operate the magazine 100 so that the blanks will be fed automatically into the working center of the machine in proper synchronism with the other mechanical operations of the machine, the slide-operating cam 76 carries a forwardly-projecting trip pin 110, which is adapted to engage with a wedge-shaped nose 111 on the end of a trip arm 112 attached to the outer rear end of a longitudinal horizontal rocker shaft 113. The rocker shaft 113 extends transversely through the housing 12 and is journaled in the front and rear walls thereof. Attached to the forward end of this shaft 113, provision is made of a clutch engaging arm 114 carrying a depending clutch pin 115 at its outer free end, which is adapted to operate a clutch member 116.

The clutch member 116 is supported on a relatively short horizontal clutch shaft 117, having its rear end journaled in an upstanding support 117a forming an integral part of the housing base. The forward end of the clutch shaft 117 in turn is journaled in a bushed bearing 118 (see Fig. 1) forming an integral part of the front wall of the housing 12.

The clutch 116 is adapted to be actuated from the main drive shaft 20 through the medium of a worm pinion 119 keyed to an intermediate part of said shaft and intermeshing with a worm wheel 120 mounted to freely rotate on the clutch shaft 117. The clutch comprises two interlockable cooperating parts, which for convenience will be called the toothed rotating clutch section 121, and the axially slidable detent member 122. The toothed member 121 is constantly rotating by reason of the fact that it forms an integral part of the worm wheel 120. Whereas, the detent member 122, on the other hand, is slidably keyed to the shaft 117 for permitting said member 122 to slide upon said shaft 117 into and out of engagement with the constantly rotating detent member 121.

In order to operate the cooperating clutch members 121 and 122, the intermediate cylindrical surface of the slidable clutch member 122 is provided with a peripheral cam groove 123 which extends substantially about the entire circumference of said clutch member 122 with the exception of a detent bridge member 124, which interrupts the groove. The clutch pin 115, previously mentioned, projects into this groove and normally engages against one side of the bridge member 124. The diameter of the pin 115 is made substantially less than the width of the groove 123, and the end of the groove 123 in which the clutch pin 115 travels has the outer left-hand face thereof, as viewed in Fig. 6, provided with an inclined surface 125 for exerting a camming action on the pin 115. The sliding clutch member 122 is pressed rearwardly at all times by a light compression spring 127 surrounding the clutch shaft 117, and having one end thereof engaging against the adjacent face of said member 122 while the opposite end engages the inner surface of the front wall of the housing 12.

When the trip pin 110 carried by the slide operating cam 76 engages the nose 111, it will be apparent that the lever 114 will be raised lifting the clutch pin 115 out of its normal position in the end of the groove 123 clear of said groove and the intersecting bridge 124. This will permit the spring 127 to slide the clutch member 122 rearwardly so that its innermost toothed edge will interlock with the constantly rotating toothed clutch member 121, and thus set the clutch shaft 117 in rotation. The clutch pin 115 carried on the end of the arm 114 will drop back into the groove 123 as soon as the detent 128 formed in the under edge of the trip lever 112 rides over the trip pin 110. The positive rocking of the shaft 113 and the trip lever 112 downwardly is insured by a spring 129 having its upper end connected to a pin 130 projecting laterally from the arm 112, while the opposite end of the spring is secured to the rear wall of the housing 12.

When the clutch member 122 is nearing the end of its rotation, the clutch pin 115 will engage the inclined cam surface 125, and will cause said member 122 to slide forwardly, disengaging the clutch teeth from each other and stopping the rotation of the shaft 117.

The intermittent rotation of the shaft 117 is transmitted to the magazine feed shaft 105 through a pair of spiral gears 131 and 132 keyed respectively to said shafts 117 and 105, and preferably having a one-to-one tooth ratio. The magazine feed shaft 105 (as best shown in Figs. 1 and 2) is journally supported in the front of the machine, outside of the housing 12, by a pair of spaced upright standards 133 and 134 formed integrally with the front edge of the tray 11.

When the feed shaft 105 is making one rotation, the roller 103 carried on the end of the lever 102 carried by the swinging lever 99 will engage the high surface of the sector cam 104 and hold the magazine 100 in normal inactive position. As the cam 104 rotates, the roller 103 will be caused to drop to the lower surface of the cam 104, causing the feeding end of the magazine 100 to be moved into coaxial alinement with the spindles 55 and 59, positioning a pinion blank between said spindles. The blank will then be picked up by said spindles, after which the magazine 100 will swing back to its normal inactive position. The shaft 105 will always come to rest with the roller 103 resting upon the high surface of the sector cam 104.

*Pinion knockout mechanism*

Before the feeding operation of the magazine 100, it is first necessary to remove the previously cut pinion gear 57 from the work spindles 55 and 59. This is accomplished by a knockout mechanism operated from the feed shaft 105, which first disengages the slidable spindle 59 from the adjacent end of the pinion blank shaft 56 and then forces the opposite end of said blank shaft 56 out of the end of the rotating spindle 55. The mechanism for accomplishing this result, and which is best shown in Figs. 2, 3, 5 and 6, includes a rockable knockout lever 135, positioned to the right of the work slide 15, and pivotally supported in the outer end of a bifurcated bracket 136 projecting from the right of the feed slide 15. The knockout arm 135 is fulcrumed in the bracket 136 by means of a pivot stud 137. In order to operate the knockout lever 135, the outer lower end of said lever 135 carries a cam-engaging roller 138, which is adapted to be engaged by a crescent wedge member 139 of an ejector cam 140. The cam 140 forms an integral part of a cylindrical hub 141, which is made secure to the right end of the magazine feed shaft 105.

The ejector cam 140 normally comes to rest at its lowermost position, as best shown in Figs. 1, 3 and 6, when the feed shaft 105 ceases to rotate, and the particular construction of this crescent shaped cam 140 is such that when the work-carrying slide is moved to the right during the gear cutting operation, the roller 138 on the end of the knockout lever 135 will clear the top edges of said crescent-shaped member 139 without interference.

The upper end of the knockout lever 135 has an integral cylindrical head 135a, which is adapted to engage within a transverse slot 142 provided in the adjacent rounded edge of a yoke member 143. The yoke member 143 is adjustably secured to the outer threaded end of the tailstock spindle 60 by means of a pair of opposed nuts 144, which also serve to confine the cylindrical head 135a within the transverse slot 142 of said yoke 143. Movement of the tailstock 60 to the right by the knockout lever arm 135 is effected against the influence of a compression spring 60a surrounding said tailstock and abutted against the adjacent face of the bushed bearing 62 and an adjustable collar 60b secured to said tailstock. It will be evident from this construction that as the knockout lever 135 is operated by the crescent-shaped cam 140, the tailstock 60 will be slid to the right within its respective bearings 61 and 62 a sufficient distance to permit the right-hand work support spindle 59 to clear the trunnioned end of the gear blank shaft 56.

In order to eject the finished hobbed pinion 56 from the left-hand rotating work spindle 55, provision is made of a relatively small slidable knockout rod 145 connected to the yoke 143. As best noted in Fig. 2, the right end of this knockout rod 145 carries a pair of locking nuts 146 and a collar member 147, which is abutted against the adjacent face of the innermost nut. A slight space is preferably left between the adjacent faces of the collar member 147 and the yoke member 143 for the purpose of permitting the tailstock 60 to move a distance sufficient to cause the end of the spindle 59 to clear the end of the blank 56 before any motion is imparted to the slidable knockout rod 145. Movement of the knockout rod 145 to the right is effected against the influence of a coiled compression spring 148 abutted between a collar 149 secured to said rod 145 and the adjacent face of the tail stock bearing 62.

The knockout rod 145 is slidably supported in the three bearings 54, 61 and 62, and has attached to its extreme left end an ejector block 150 which is adapted to slidably embrace the rotating headstock spindle 51. As best shown in Fig. 5, the block 150 has an annular groove 151 machined within the interior thereof which is adapted to receive the opposite ends of a small transverse pin 152 positioned in a slot 153 cut transversely through said head stock 51.

As shown in Fig. 5, the work driving spindle 55, which is fitted into the hollow socket of the head stock 51, as previously explained, has a longitudinal small ejector pin 154 located concentrically therein, and passing through substantially the entire length of said spindle with its outer end positioned adjacent the end of the pinion blank spindle 56. The opposite end of the knockout punch 154 is provided with an enlarged head 155 which telescopically engages within one end of a cylindrical chamber 156 provided within the spindle 55, and which is adapted to abut against the transverse pin 152 being held thereagainst by a small helical spring 157 housed within the chamber 156 and surrounding the ejector pin 154. Obviously, when the ejector block 150 is moved to the right, the ejector pin 154 will force the completed hobbed pinion 57 out from the end of the work spindle 55.

*Adjustable hob-cutter head*

The cutting of the teeth of the pinion 58 is accomplished by means of an angularly adjustable hobbing unit 158 superimposed upon the cover plate 13, and carrying the cutter hob 63 previously mentioned. The unit comprises a cast metal housing 159, including a hollow vertical cylindrical portion 160 and a laterally offset integral gear housing 161, both parts of which are open at the top and adapted to be closed by a unitary detachable cover 162.

The cylindrical portion 160 of the hobbing unit, as best shown in Fig. 4, is designed to adjustably fit about a vertical tubular supporting post 163, the lower end of which is slightly reduced in diameter and adapted to have a tight fit in a cylindrical opening 164 provided in the housing cover plate 13. The post 160 fits against the top surface of an annular pad 165 provided on the top of the cover plate 13, and said post is tightly secured to said plate by a large nut 166 having screw threaded engagement with the lower threaded end of the post and binding against the under surface of said cover plate 13.

Power is transmitted to the rotating cutter hob 63 through a vertical hob-driving shaft 167 (Fig. 6) suitably journaled in a pair of spaced flanged bearing bushings 168 and 169, secured within the fixed tubular post 163 (see Fig. 4). A large spiral gear 170 is suitably keyed to the lower end of the vertical shaft 167 and is held in place by a clamping nut 171. The spiral gear 170 is adapted to intermesh with a similar spiral gear 172 positioned at right-angles thereto on a horizontal axis, and keyed to an intermediate part of the main drive shaft 20 within the housing 12. The upper end of the vertical shaft 167 carries a small spiral gear 173 which is adapted to intermesh with a relatively large spiral gear 174 confined within the gear housing 161 and suitably keyed to the horizontal hob carrying spindle 64. The gear 173 engages the spiral gear 174 through a suitable opening 175 provided within the side wall of the tubular post 163, as shown in Fig. 4.

The hob carrying spindle 64 is journaled within the gear housing 161 by means of a spindle bearing hub 176 projecting from the forward face of the offset housing 161 and another bushed bearing 176a projecting from the rear face of said housing 161 (see Fig. 2).

*Vertical and angular adjustment of hobbing unit*

The width of the face of the spiral gear 173 on the vertical shaft 167 is made wide enough to permit the gear 174 to be raised and lowered with respect thereto without becoming operably disengaged. The adjustment of the gears 173 and 174 relative to each other is accomplished by raising and lowering the housing 159 with respect to the supporting post 163. The vertical adjustment of the housing 159 is effected by the employment of two relatively large opposed upper and lower knurled nuts 177 and 178. The nuts 177 and 178, as best shown in Fig. 4, are located at opposite ends of the cylindrical portion 160 of the housing 159 and have screw threaded engagement with spaced threaded end sections 179 and 180 of the tubular post 163. The lower nut 178 is adapted to be interposed between the pad 165 and the cylindrical portion 160 of the housing for supporting the entire weight of the adjustable unit thereabove. The top open end of the tubular post 163 projects above the cover member 162 and is adapted to be closed by a flanged cap 181 to permit the introduction of lubricant and prevent the entrance of foreign matter, and said cap may be readily removed to permit access to the interior mechanism.

In order to obtain the desired angular adjustment of the hobbing unit 158 about the vertical axis of the post 163, and thereafter lock said unit in adjusted position, provision is made of an outboard support 182 having an arcuate base 183 and an upstanding arm 184. The arcuate base 183 is adjustably supported on a pad 185 formed integral with the top surface of the cover plate 13, and said base 183 is provided with a pair of opposite elongated end slots 186, 186 for receiving bolts 187, 187 to connect it with said pad 185 (see Fig. 4).

The upper end of the upstanding arm 184 is provided with an integral vertical elongated slotted head 188 which is adapted to be positioned in side-by-side relationship with a lateral lug or ear 189 integral with the gear housing 161, as best shown in Fig. 4. Provision is also made of a locking screw 190 having threaded engagement in the lug 189 and slidable in the elongated slotted head 188.

In order to permit accurate adjustment of the gear hobbing unit, a graduated scale 191 is provided in the top surface of the pad 185, as shown in Fig. 2. Moreover, if desired, the adjacent surface of the arcuate base 182 may also be graduated with a "vernier" scale (not shown) to increase the accuracy of the setting. Another scale 192, as shown under the cut-away section of the casing 16 in Fig. 2, is provided on the top surface of the bottom nut 178 for indicating the height of the cutter by reference to a setting mark 193 (see Fig. 3) on a flattened finished pad 194 formed at the lower end of the cylindrical section 160.

To set the hobbing unit 158 into cutting position for a specific pinion, the upper nut 177 will first be loosened, after which the bolts 187, 187 will also be loosened. The unit 158 will then be moved around the post 163 as far as required for the dimensions and type of gear to be hobbed,— the exact setting being shown by the graduated scale 191. The bolts 187 will be tightened, thus completing the angular adjustment.

In order to make the necessary vertical adjustment of the hobbing unit 158, the locking screw 190 at the left of the housing 161 (Fig. 4) will be loosened slightly. The housing 159 will then be moved upward or downward to the desired vertical position by manipulating the top knurled nut 177 and the lower knurled nut 178. The unit will then be locked securely in vertical adjusted position by tightening the upper nut 177 and the screw 190.

*Hob cooling and lubricating system*

To provide for the necessary cooling and lubrication of the hob 63 in cutting the teeth of the pinion blank 57, provision is made of an angular lubricant supply tube 195 pivotally mounted in the front end of a raised hollow boss 196 formed integrally with the top of the cover plate 162. The lower end of the tube 195 is formed with a flattened restricted nozzle 197 for the purpose of distributing lubricant over the entire surface of the cutting hob 63. The nozzle end 197 of the tube 195 is adapted to be located adjacent the cutting surface of the hob 63, but may be swung out of the way when desired. A fluid conductor 198 is suitably connected to the rear enlarged end 199 of the boss 197 and may be controlled by a suitable petcock (not shown) located anywhere in the line of the fluid conduit.

*Operation*

In the operation of the machine, when the power is turned on, the hob spindle 64 and the cam 76 at the rear of the machine will start to rotate. This will cause the pin 110 carried by said cam to come into contact with the wedge nose 111 of the trip lever 112, lifting the arm 114 and allowing the spring 127 to throw the clutch mechanism 116 into operation, thus causing the magazine-operating shaft 105 to rotate. The rotation of the shaft 105 and the sector cam 104 carried thereby permits the roller 103 to drop from the high section of said cam to the lower section thereof, causing the magazine 100 to deliver a pinion blank 57 into co-axial alinement with the spindles 55 and 59.

Previous to the feeding operation of the magazine, the crescent cam 140 at the right-hand end of the shaft 105 will have swung the knockout lever 135 about its pivot 137 and moved the tailstock 60 carrying the spindle 59 a short distance to the right for the purpose of permitting the initial gear blank 57 to be fed into the working center of the machine without interference. When the gear blank 57 is properly arranged between the spindles 55 and 59, the tail stock 60 will be permitted to move to the left under the expansion of the spring 60a so that the socket of the work spindle 59 will slip over the trunnion 56a at the right-hand of the spindle 56. Further movement of the tailstock 60 to the left will cause the trunnion 56a at the left end of the spindle 56 to be inserted into the socket at the end of the driving spindle 55. The friction between the blank 57 and the socket of the spindle 56 causes said blank to rotate with the head stock shaft 51.

When the blank 57 is thus held in hobbing position, the delivery end of the magazine 100 will swing out of the way under the control of the sector cam 104 and the roller 103.

The pinion blank 57 having thus been properly located and set into rotation, the work-carrying slide 15 will immediately start to travel to the right, as viewed in the several figures, at a rapid speed determined by the shape of the cam 76. The enlarged cylindrical section 58 of the pinion blank 57 will then engage the hob 63, and the initial cutting operation by the hob 63 will be effected at a diminishing rate of speed until the full depth of the gear tooth is reached. The slide 15 will then be advanced by the cam 76 at a uniform slower rate of speed for the remainder of the hobbing cut, said speed being in accordance with standard gear cutting practice. By the use of properly proportioned gears, interconnected as shown, and all of which are driven from a common drive shaft, a predetermined relation is obtained between the speed of the hobbing cutter 63 and the speed of the pinion blank 57 whereby axially directed pinion teeth will be cut in the blank as it is fed in the direction of its axis beneath the hob 63. This arrangement of interconnected gears, of the form shown, permits the cutting of teeth on blanks of different sizes by the simple expedient of substituting different idler gears 28 to obtain the proper relation between the speeds of the size of blank 57 to be cut, and the hobbing cutter 63 required for cutting such teeth. The work slide 15 will then be retracted to its normal left-hand position (as best shown in Figs. 1 and 5) by the action of the strong spring 91 located underneath said slide. It is to be noted at this point that the return of the slide 15 will be effected by the cam 76 at a more rapid speed for the purpose of saving time and increasing production.

When the work slide 15 has returned to its starting position, the completed pinion 57 will be automatically ejected from the ends of the work-supporting spindles 55 and 59 before the insertion of the next gear blank. This is accomplished by the crescent-shaped cam 140 carried by the shaft 105 which swings the knockout lever 135 to cause the tail stock 60 carrying the support spindle 59 to be again moved to the right sufficiently to clear the end of said spindle 59 from the trunnion 56a of the spindle 56. Further movement of the tailstock 60 to the right causes the yoke member 143 attached to the outer end of said tail stock to move the small rod 145, and causes the ejector block 150 to drive the pin 154 within the spindle 55 to force the adjacent trunnion 56a out of the socket thereof. The cut pinion 57 will then drop upon an inclined surface 200 of the slide 15, as best shown in Figs. 1 and 2, located between the bushed bearings 54 and 61, and will roll forwardly and drop off from the front edge of said slide and be caught in any suitable container or basket, not shown, supported on the front edge of the basin-like base 11 in front of the housing 12.

After the cut pinion has been discharged in the above manner, the delivery end of the magazine 100 will again move in as already described, and the cycle of operations will be repeated as long as the machine is in operation.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a gear hobbing machine, a rotating hobbing cutter, means for continuously rotating a gear blank while in position to be cut by said cutter, a swinging magazine pivoted on an axis located above said cutter and blank and carrying blanks below said cutter, and spring-operated means for forcing the lower end of said magazine toward said cutter to feed an uncut blank into cutting position.

2. In a gear hobbing machine, a rotating hobbing cutter, means for continuously rotating a gear blank while in position to be cut by said cutter, a swinging magazine pivoted on an axis located above said cutter and blank and carrying blanks below said cutter, and yieldable means for forcing the lower end of said magazine toward said cutter to feed an uncut blank into cutting position.

3. In a gear hobbing machine, a rotating hobbing cutter, means for continuously rotating a gear blank at an angle to the axis of said cutter, a swinging magazine pivoted on an axis located above said cutter and blank and carrying blanks below said cutter, yieldable means for forcing the lower end of said magazine toward said cutter to feed an uncut blank into cutting position, and cam controlled means for returning said magazine into a clear position after the feeding operation.

4. In a gear hobbing machine, a rotating hobbing cutter, means for continuously rotating a gear blank at an angle to the axis of said cutter, a swinging magazine pivoted on an axis located above said cutter and blank and carrying blanks below said cutter, yieldable means for forcing the lower end of said magazine toward said cutter to feed an uncut blank into cutting position, and positive power-driven means for returning said magazine into a clear position after the feeding operation.

5. In a gear hobbing machine, a main drive shaft, a hobbing cutter, means connected with said shaft for driving said cutter, a gear blank-carrying slidable member, cam means connected with said shaft for sliding said member with respect to said cutter during the cutting operation, means connected with said drive shaft for independently rotating said gear blank, a swinging gear blank-carrying magazine, yieldable means connected with said shaft for swinging said magazine to feed a blank to said member, and cam-operated means connected to said shaft for automatically ejecting a completed gear from said member.

6. In a gear hobbing machine, a main drive shaft, a hobbing cutter, means connected with said shaft for driving said cutter, a gear blank-carrying slidable member, cam means connected to said shaft for sliding said member with respect to said cutter during the cutting operation, means connected to said drive shaft for independently rotating said gear blank, a swinging blank-carrying magazine, cam-controlled means connected with said shaft for operating said swinging magazine to feed a blank to said member, cam-operated means connected to said shaft for automatically ejecting the completed gears from said member, and cam-operated clutch mechanism for initiating the operation of said magazine swinging mechanism and ejecting mechanism at the proper point in the cycle of the machine.

7. In a gear hobbing machine, a rotating hobbing cutter, a gear-blank-carrying member slidable with respect to said cutter and having a headstock and a tailstock, means to feed gear blanks to said member before the cutting operation, means to eject the completed gears at the conclusion of the cutting operation, said ejecting means including a rotating cam, a lever engaging said cam, said lever being connected to said tailstock to move it away from said headstock and withdraw the support from one side of said gear, an ejector rod slidably mounted within said headstock, and means loosely connected with said lever for pushing the other end of said gear out of said headstock to permit said gear to drop out of said member.

8. In a machine for cutting teeth in a gear blank, a shaft for supporting a gear blank, a rotatable hob, oppositely directed axially slidable blank holding spindles adapted to secure the ends of said gear blank, means to rotate said spindles and said hob in unison, an axially slidable ejector associated with one of said spindles to eject the blank therefrom, means to move one of said spindles relative to the other, and a single cam adapted to actuate said ejector and said spindle moving means.

9. In a machine for cutting teeth in a gear blank having a shaft, a rotatable hob, a slidable carrier, means to slide said carrier, oppositely directed spindles mounted on said carrier and adapted to receive the ends of said gear blank shaft, means to rotate said spindles and said hob in unison, an axially slidable ejector located within one of said spindles to eject the blank shaft therefrom, means to move one of said spindles relative to the other, means to feed a blank into operating position between said spindles, and a single cam member adapted to control the actuation of said ejector, said spindle moving means, and said blank feeding means and to actuate said carrier sliding means.

10. In a machine for hob-cutting teeth in a spur gear pinion, a rotatable hob-carrying spindle, a pair of opposed pinion blank carrying spindles, a holder for said blank spindles adapted to slide axially with respect to said blank, one of said blank spindles being movable away from the other, a pinion blank ejector in the other spindle and adapted to be moved to eject a pinion blank from this spindle, a common drive shaft, change gears drivingly connected to said common drive shaft, an intermediate shaft between said common drive shaft and said hob spindle, an intermediate shaft between said change gears and said blank spindles, a pair of meshing gears connecting each intermediate shaft with its associated spindles, a pair of meshing gears connecting one of said intermediate shafts with said change gears, another pair of meshing gears connecting the other of said intermediate shafts with said comomn shaft, said shafts and gears constituting the sole driving means for said spindles, said change gears including an idler gear adapted to be replaced by other idler gears to vary the speed proportions between said spindles, a cam drivingly connected to said change gears, a lever arm actuated by said cam to slide said spindle holder, and a lever actuated by said cam to move said movable blank spindles and said blank ejector.

11. In a machine for hob-cutting teeth in a spur gear pinion, a rotatable hob-carrying spindle, a pair of opposed pinion blank carrying spindles, a holder for said blank spindles adapted to slide axially with respect to said blank, one of said blank spindles being movable away from the other, a pinion blank ejector in the other spindle and adapted to be moved to eject a pinion blank from that spindle, a comomn drive shaft, change gears drivingly connected to said common drive shaft, an intermediate shaft between said common drive shaft and said hob spindle, an intermediate shaft between said change gears and said blank spindles, a pair of meshing gears connecting each intermediate shaft with its associated spindles, a pair of meshing gears connecting one of said intermediate shafts with said change gears, another pair of meshing gears connecting the other of said intermediate shafts with said common shaft, said shafts and gears constituting the sole driving means for said spindles, said change gears including an idler gear adapted to be replaced by other idler gears to vary the speed proportion between said spindles, a cam drivingly connected to said change gears, a lever actuated by said cam to slide said spindle holder, a lever actuated by said cam to move said movable blank spindle and said blank ejector, a magazine adapted to hold a plurality of pinion blanks and swingable to present one to said spindles below said hob spindle, and means to swing said magazine, said magazine swinging means being controlled by said cam.

12. In a gear hobbing machine, a rotating hobbing cutter, a gear-blank-carrying member slidable with respect to said cutter and having a headstock and a tailstock, means to feed gear blanks to said member before the cutting operation, means to eject the completed gears at the conclusion of the cutting operation, said ejecting means including a cam, a lever engaging said cam, said lever being connected to said tailstock to move it away from said headstock and withdraw the support from one side of said gear, an ejector rod slidably mounted within said headstock, and means loosely connected with said lever for pushing the other end of said gear out of engagement with said headstock to permit said gear to drop out of said member.

FREDERICK LUX.